United States Patent Office 2,776,884
Patented Jan. 8, 1957

2,776,884

PROCESS FOR THE MANUFACTURE OF ALUMINUM

Erhard Grunert, Grenoble, France, assignor to Pechiney, Compagnie de Produits Chimiques et Electrometallurgiques, Paris, France, a corporation of France No Drawing. Application December 12, 1952,
Serial No. 325,711

Claims priority, application France December 19, 1951

8 Claims. (Cl. 75—68)

It is known that when aluminous raw materials are reduced with carbon, a pre-alloy is obtained which, in addition to containing all the impurities of the starting material, also contains alumina and aluminum carbide—$Al_4C_3$. The impurities are iron, silicon and titanium. Attempts have been made to separate the aluminum from these troublesome products by several methods. But, until now, these methods have not been adopted in the industry. Various attempts have been made to remove the Al and CO products of the reaction $$Al_2O_3 + 3C \rightleftharpoons 2Al + 3CO$$

in the gaseous state from the furnace.

However, the process is rendered difficult by the high velocity of the reverse reaction. Moreover, an appreciable portion of the impurities is retained in the distillate.

It has been proposed according to another process, to deposit aluminum between 2600° K. and 2400° K. in order to separate it from CO. But at this temperature, the vapor pressure of aluminum is already so high, that the process is unworkable in practice.

Actually, there does not exist a process for reducing aluminous material with carbon which yields a metal of commercial purity in a simple manner.

Investigation by the present applicant of the equilibrium of the reaction set out above and also, that of the carbide—$Al_4C_3$—closely connected therewith, as well as the behaviour of the impurities during the course of the reduction, have shown that there is a way rendering possible such a process, the same being based on the following findings:

A study of the formation and stability of aluminum carbide has established that above 1200° K., the velocity of formation of $Al_4C_3$ from its elements is governed by the velocity of diffusion $Al/Al_4C_3$; it follows, that the formation velocity of $Al_4C_3$ is a function of temperature, of time, of contact surface.

For example, at 1700° K. and with an aluminum surface of 7500 sq. mm. per gramme of Al, 100% of carbide is obtained in 5 minutes.

Above 2200° K., the dissociation of aluminum carbide into its elements begins. At 2300° K., under normal pressure, the dissociation affects only the surface of the carbide because the diffusion of the gases within the carbide is not great; on the other hand, its decomposition pressure is already sufficiently high so that the carbide can be decomposed on an industrial scale at a pressure of 20–50 mm. Hg. This result is in agreement with the recently determined value for the heat of formation of $Al_4C_3$ from its heat of solution in HCl ($-30$ Kcal$\pm 0.5$ Kcal at 298° K.). Using this figure, the vapor pressure of aluminum as calculated for 2300° K. is found to be 0.05 atm.

Study of the behaviour of the impurities has established the following:

The oxides of iron, silicon and titanium are more easily reducible than alumina; therefore, there is a risk of finding them quantitatively alloyed with the aluminum in the final product.

On the other hand, the compounds of iron with aluminum Fe–$Al_m$, of silicon with aluminum Si–$Al_n$, and of iron with silicon and aluminum Fe–$Si_p$–$Al_n$, as well as the carbides SiC and TiC, etc., are notably more stable than aluminum carbide at the temperatures under consideration. (The suffixes $m$, $n$, $p$ represent various numerical values, depending on the particular compound.)

For instance, when aluminous raw materials are reduced, aluminum cannot be quantitatively transformed into carbide, even if a large excess of carbon be used and even if the compounds be finely ground and intimately mixed; in addition to $Al_4C_3$, there are always obtained alloys such as $FeSi_pAl_n$ containing appreciable amounts of aluminum. Moreover, when it is attempted to carburize such alloys at 2100° K.—the alloys being finely ground and intimately mixed with an excess of carbon— it is found that there is only a weak reaction whereas, under the same conditions, the aluminum alone is in practice instantaneously and completely carburized.

The reduction of alumina with carbon has also been studied.

As is known, this reduction only starts to take place at an industrially utilizable velocity when the alumina is fluid or even molten.

Slightly above the melting point of $Al_2O_3$, at about 2350° K., the reaction is brisk; at 2500° K., it is very violent and at this temperature there takes place intense vaporization of the material contained in the furnace.

The reduction of alumina leads in the first stage to the sub-oxide $Al_2O$:

$$Al_2O_3 + 2C = Al_2O + 2CO$$

As the aluminum is monovalent in $Al_2O$, this oxide belongs, from the standpoint of its properties, to the group of alkaline oxides. Accordingly, it is basic in character, and yields salts with acidic alumina. The existence of such salts is deduced from the crystallization curve of the system $Al/Al_2O_3$, already known a long time. This curve has, for example, a maximum at 2324° K. for a combination which the investigators, in their day, could only represent by the approximate formula $Al_8O_9$, because the sub-compounds of aluminum were still unknown in those days.

As a matter of fact, the compound $Al_8O_9$ corresponds to the salt:

$$3Al_2O.5Al_2O_3 = 2Al_8O_9$$

which contains 29% $Al_2O$ and melts at 2324° K.

It follows that, when aluminous material is reduced, the sub-oxide $Al_2O$ can be present in appreciable concentrations in the liquid phase.

As to the existence of $Al_2O$ in a gaseous phase, it is known that it can be distilled in a high vacuum at 1700° K. Investigations have established that, even at normal pressure, there may be an appreciable concentration of $Al_2O$ in the gaseous phase. To verify this point, aluminum powder was heated at 2000° K. Aluminum powder of ordinary quality is strongly oxidized on its surface (content of $Al_2O_3$—13%) and thus constitutes an ideal mixture of aluminum and alumina. At 2000° K., the entire amount of alumina distills quantitatively in the form of $Al_2O$, out of the powder in a few minutes, and condenses on cooler spots with reformation of $Al_2O_3$. The same phenomenon occurs at higher temperatures, starting at 2000° K., when mixtures of carbon and alumina, in the ratio 2 C for 1 $Al_2O_3$, are used. The vapor pressure of $Al_2O$ is therefore not slight; it is appreciably higher than that of aluminum and, as a result, $Al_2O$ can be distilled off starting at 2000° K. and at atmospheric pressure in a stream of inert gas.

By way of example, at 2350° K., that is to say, slightly above the fusion point of pure alumina, there is obtained a gaseous mixture containing 10% Al₂O, 27% Al and the remainder CO.

Finally, investigations have established that the inversion of the reactions (a)  Al₂O₃+2C⇌Al₂O+2CO
(b)  Al₂O+C⇌2Al+CO occurs at 1900° K. Above this temperature, the gaseous atmosphere within the furnace is optically void (blank), Al, Al₂O and CO existing simultaneously. At 1900° K., a deposit forms, composed of Al₂O₃, Al₄C₃ and C.

The properties of Al₄C₃, its high formation velocity, ready decomposition in a vacuum, make it possible to separate aluminum from its impurities.

To this end, it is necessary to carry out the reduction of the alumina to the carbide so as to obtain a good yield, with a view of obtaining a raw carbide which, by subsequent heating, for example, at 2300° K. and at 20–50 mm. Hg, enables metallic aluminum of commercial purity (grade) to be extracted. It is not possible to operate in such a manner that the reduction of aluminous raw material is carried to the carbide in a single step; this is so because, above the melting point of alumina, i. e. at the temperatures required for the reduction at commercial rates of reaction, the carbide Al₄C₃ decomposes. The difficulty is obviated in the following way which constitutes the main feature of the present process. The reduction of the aluminous material is effected between 2400° and 2500° K. and the gaseous products—Al, Al₂O, CO—are contacted with carbon (coke, for example), whilst avoiding appreciable reoxidation of Al and Al₂O by CO, that is to say, by maintaining them at a temperature above 1700° K. and, preferably, above 1900° K. The carbide Al₄C₃ is then formed by the combination (fixing) of the Al and Al₂O by the coke, while the oxide of carbon is removed. In this manner, the separation of the aluminum and of the carbon monoxide is obtained.

The aluminum carbide is thereafter decomposed by heating it at a suitable temperature and vacuum, for example, 2300° K. at 20 to 50 mm. of mercury. The carbon can be recovered.

In view of the high temperature in the reduction furnace, it is unavoidable that some quantities of the impurities present in the raw material (Fe, Si, Ti) distill over—more or less—towards the coke-containing chamber, each in proportion to its vapor pressure. When only small amounts are involved, their presence in the raw carbide in harmless. Iron, silicon and titanium become fixed in the raw carbide, partly as carbides and partly in the form of alloys with aluminum, and the vapor pressures of all these compounds are far lower than the dissociation pressure of Al₄C₃; for this reason they are found only in small amounts in the condensed aluminum produced by the decomposition of the raw carbide.

However, when greater amounts of impurities are involved, the quantities of aluminum with which these metals are combined—either in the reduction furnace or in the carbon layer—now become considerable and these quantities actually become lost. Accordingly, it becomes necessary to eliminate these impurities in the form of an iron-silicon-titanium alloy before reducing the corundum.

On the other hand, it is more economical to carry out the reduction in such a manner that a large part of the aluminum escapes in the form of Al₂O; thus, an important fraction of the heat of condensation of Al and of Al₂O, and of the heat of formation of the carbide, is absorbed by the reduction of the Al₂O in the layer of the carbon and enables control of the flue temperature.

According to the invention, the complete reduction of the aluminous raw material will be effected in three stages.

First stage comprises two steps:

*First step.*—The preparation of the corundum from the aluminous raw material, for example, bauxite.

This involves the reduction of the larger part of the iron, silicon and titanium oxides with a calculated and purposely limited amount of carbon, and tapping (running) off of the corresponding metals. This reduction may be carried out in an electrothermic furnace of a known type, or in a metallurgical furnace such as a blast-furnace, hearth, etc.

*Second step.*—Reduction of the formed corundum by the addition of a further quantity of carbon so calculated and purposely limited in amount as to distill off a mixture of Al₂O, Al and CO.

The temperature of the corundum is preferably kept between 2400° K. and 2500° K. during the reduction. The operation is carried out at a pressure close to atmospheric in an atmosphere of carbon monoxide.

Second stage:

Complete reduction of the Al and Al₂O with an excess of carbon (for example, in a column filled with coke) and formation of aluminum carbide. At 1700° K. and above, the Al unites almost instantaneously with the carbon to form Al₄C₃. In contrast thereto, a temperature of 2300° K. is necessary in order to reduce Al₂O rapidly. The temperature at the inlet of the coke column will, therefore, be maintained at 2300° K. The operation is carried out in the absence of air and, preferably, at a pressure close to atmospheric.

Third stage:

The dissociation of the aluminum carbide at a suitable temperature and vacuum, preferably at 2300° K. and at a pressure of 20–50 mm. of mercury.

The aluminum is condensed to the solid or liquid state. The carbon can be recovered.

I claim:

1. A process for reducing aluminous material with carbon to aluminum carbide wherein the dissociation of the formed aluminum carbide is advantageously inhibited, comprising the steps of: reducing the aluminous materials with carbon in a first stage at a temperature of at least 2400° K. under conditions of substantially atmospheric pressure and in the absence of air to produce a gaseous phase mixture of Al, Al₂O and CO, and thereafter, in a second stage, completing the reduction of the Al content in the mixture to aluminum carbide by contacting the said mixture with an additional amount of carbon at temperatures within the range of 1700°–2300° K. at substantially atmospheric pressure and in the absence of air.

2. A process of recovering aluminum from alumina-containing raw materials comprising reducible oxides as impurities, which comprises the following steps: selectively reducing the said impurities with a restricted amount of carbon at a temperature effective to reduce said impurities and maintain the formed corundum present in the reaction mixture in a fluid state; substantially segregating the reduced impurities from the reaction mixture; treating the remaining fluid corundum with a limited amount of carbon at a temperature within the range of 2400°–2500° K. under conditions of substantially atmospheric pressure and in the absence of air to produce a gaseous mixture of Al, Al₂O and CO; treating the said gaseous mixture with an excess of carbon at temperatures within the range of 1700°–2300° K. at substantially atmospheric pressure and in the absence of air whereby the aluminum content of said mixture is substantially entirely converted into Al₄C₃; separating the formed Al₄C₃; treating the same under temperature and pressure conditions effective to selectively dissociate it into its elements to the substantial exclusion of dissociating any other compound associated with the aluminum carbide as a result of the impurities aforesaid, whereby aluminum of commercial purity is produced in the vapor state; removing and condensing the aluminum so produced, and recovering the condensed aluminum.

3. A process according to claim 2, wherein the impurities comprise at least one oxide of the group consisting of the oxides of iron, silicon, titanium.

4. In a process of extracting aluminum from aluminous materials associated with impurities, comprising the steps of selectively reducing the aluminous material to $Al_4C_3$ with carbon in two successive stages at substantially atmospheric pressure and in the absence of air, and dissociating the formed $Al_4C_3$ into its elements, the improvement which consists in carrying out the dissociation of the carbide at a pressure below atmospheric whereby the aluminum is evolved in the vapor state.

5. A process according to claim 4, wherein the dissociation is carried out at a temperature of about 2300° K. and at a pressure of 20–50 mm. Hg.

6. A process for reducing aluminous material with carbon to aluminum carbide, wherein the dissociation of the formed aluminum carbide is advantageously inhibited, comprising the steps of: reducing the aluminous material with carbon in a first stage at a temperature within the range of 2400°–2500° K. under conditions of substantially atmospheric pressure and in the absence of air to produce a gaseous phase mixture of Al, $Al_2O$ and CO and, thereafter, in a second stage, completing the reduction of the Al content in the mixture to aluminum carbide by contacting the said mixture with an additional amount of carbon at temperatures within the range of 1700°–2300° K. at substantially atmospheric pressure and in the absence of air.

7. A process for recovering aluminum from aluminous material comprising the steps of: reducing the aluminous material with carbon in a first stage at a temperature of at least 2400° K. under conditions of substantially atmospheric pressure and in the absence of air to produce a gaseous phase mixture of Al, $Al_2O$ and CO, and thereafter, in a second stage, completing the reduction of the Al content in the mixture to aluminum carbide by contacting the said mixture with an additional amount of carbon at temperatures within the range of 1700°–2300° K. at substantially atmospheric pressure and in the absence of air; dissociating the resultant aluminum carbide into its elements by heating it at a high temperature and at a sub-atmospheric pressure, whereby the aluminum is evolved in a vapor state; condensing the aluminum vapor and recovering the same.

8. A process according to claim 7, wherein the dissociation is carried out at a temperature of about 2300° K. and at a pressure of 20–50 mm. Hg.

References Cited in the file of this patent
UNITED STATES PATENTS

| | | |
|---|---|---|
| 2,184,705 | Willmore | Dec. 26, 1939 |
| 2,206,562 | Gentil | July 2, 1940 |
| 2,400,000 | Gardner | May 7, 1946 |